United States Patent [19]

Chibani et al.

[11] Patent Number: 5,081,570
[45] Date of Patent: Jan. 14, 1992

[54] CONTROL SYSTEM FOR ELECTRIC POWER SUPPLY

[75] Inventors: Ali Chibani, Kobe; Katsuya Hirachi, Takatsuki, both of Japan

[73] Assignee: Yuasa Battery Co., Ltd., Takatsuki, Japan

[21] Appl. No.: 493,528

[22] Filed: Mar. 14, 1990

[30] Foreign Application Priority Data

Mar. 17, 1989 [JP] Japan .................................. 1-66665

[51] Int. Cl.$^5$ .................... H02M 3/335; H02M 5/458
[52] U.S. Cl. .......................................... 363/17; 363/98
[58] Field of Search ..................... 363/17, 37, 89, 98, 363/132

[56] References Cited

U.S. PATENT DOCUMENTS 3,913,002 10/1975 Steigerwald et al. ................. 363/18
4,591,963 5/1986 Retotar ................................ 363/37

Primary Examiner—Peter S. Wong
Attorney, Agent, or Firm—Armstrong, Nikaido, Marmelstein, Kubovcik & Murray

[57] ABSTRACT

An upper limit value is set up which is larger by a prescribed value than a current value of an ideal sine wave, a lower limit value is set up which is smaller by a prescribed value than the current value of the ideal sine wave. Plural semiconductor switches are actuated according to a clock pulse of specified frequency supplied from a clock pulse generator so that a boosting mode is maintained until an alternate input current increases to reach the upper limit setting value during the boosting mode and a transfer mode is maintained until the alternate input current decreases to reach the lower limit setting value during the transfer mode, thus the semiconductor switches are actuated according to the frequency of the clock pulse at the time of this transfer mode.

1 Claim, 3 Drawing Sheets

FIG. 3
PRIOR ART
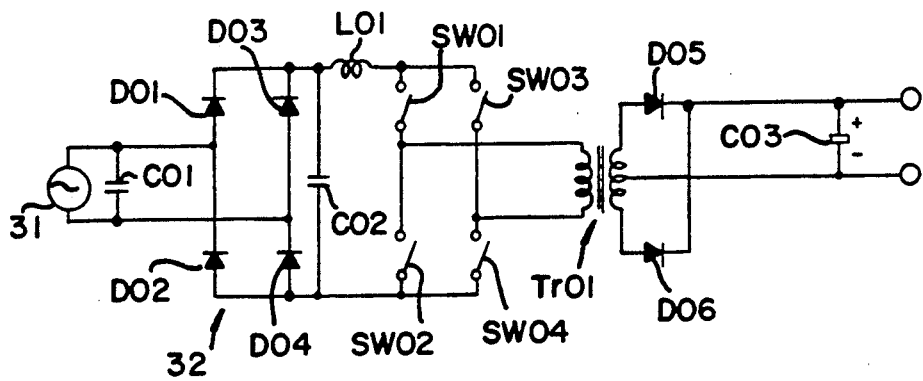
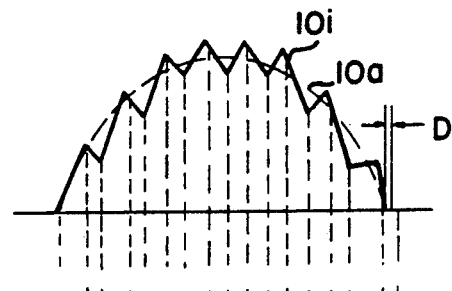
FIG.4(a)
FIG.4(b)
FIG.4(c)
FIG.4(d)
FIG.4(e)
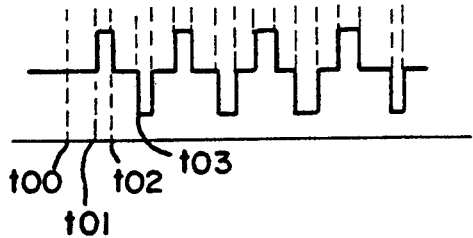
FIG.4(f)

CONTROL SYSTEM FOR ELECTRIC POWER SUPPLY

BACKGROUND OF THE INVENTION

1. Industrial Useful Field

This invention relates to a control system for an electric power supply which approximates an alternate input current to a sine wave by using a choke coil.

2. Prior Art

Generally, in an electric power supply which directly rectifies an alternate current to obtain a direct current, it has been required to eliminate a higher harmonic failure by improving a power factor on an alternate current receiving side because an alternate input current has had a pulse-shape including no idle period so that a power factor has not become 100%.

For this reason, an electric power supply having power factor improving function in itself has conventionally been proposed as illustrated by FIG. 3. This electric power supply has been controlled by a not-shown control circuit as diagrammed by FIG. 4. In FIG. 4; (a) represents a relation between a current $10i$ flowing into a choke coil L01 and an ideal sine wave $10a$, (b) represents an operation timing of a semiconductor switch SW01, (c) represents an operation timing of a semiconductor switch SW02, (d) represents an operation timing of a semiconductor switch SW03, (e) represents an operation timing of a semiconductor switch SW04, and (f) represents a secondary output of a transformer Tr01, respectively. A voltage of an alternate current power supply 31 is supplied to the choke coil L01 through a rectifying circuit 32 composed of four diodes D01, D02, D03 and D04. Incidentally, the alternate input current is one in which high frequency components are cut from the current $10i$ flowing into the choke coil L01 by a capacitor C02. When the semiconductor switch SW01 is turned on and the semiconductor switch SW03 is turned off with the semiconductor switch SW02 turned on and the semiconductor switch SW04 turned off at a time t00, the current $10i$ flows through the semiconductor switches SW01 and SW02 to the choke coil L01 and an energy is accumulated therein so as to provide a mode gradually increasing the current $10i$ i.e. a boosting mode. When the semiconductor switch SW02 is turned off and the semiconductor switch SW04 is turned on with the semiconductor switch SW01 turned on and the semiconductor switch SW03 turned off at a time t01, the energy accumulated in the choke coil L01 circulates through the semiconductor switch SW01, a primary winding of the transformer Tr01 and the semiconductor switch SW04, and at the same time, is rectified by a diode D05 and transferred to a capacitor C03; so as to provide a mode gradually decreasing the current $10i$ i.e. a transfer mode. Then, when the semiconductor switch SW01 is turned off and the semiconductor switch SW03 is turned on with the semiconductor switch SW02 turned off and the semiconductor switch SW04 turned on at a time t02, the current $10i$ flows through the semiconductor switches SW03 and SW04 to the choke coil L01 and the energy is accumulated therein; so that the transfer mode shifts to the boosting mode again. Further, when the semiconductor switch SW02 is turned on and the semiconductor switch SW04 is turned off with the semiconductor switch SW01 turned off and the semiconductor switch SW03 turned on at a time t03, the energy accumulated in the choke coil L01 circulates through the semiconductor switch SW03, the primary winding of the transformer Tr01 and the semiconductor switch SW02, and at the same time, is rectified by a diode D06 and transferred to the capacitor C03; so that the boosting mode shifts to the transfer mode again, which decreases the current $10i$ gradually. When the same operations are repeated frequently, a secondary output of the transformer Tr01 is obtained as diagrammed by (f) of FIG. 4. In order to obtain the alternate input current such as the ideal sine wave diagrammed by (a) of FIG. 4, it may be enough to change a duty ratio of the boosting mode with the transfer mode and to cut high frequency components by the capacitor C02. Namely, it may be enough to increase an operation time of the boosting mode when increasing the alternate input current, and to increase an operation time of the transfer mode when decreasing the alternate input current. A conventional electric power supply having such a structure is disclosed in Japanese Unexamined Patent Publication NO. 63-190557.

In the foregoing conventional control system, a sum of the operation time for one boosting mode and that for the succeeding transfer mode is always constant, and the duty ratio of the transfer mode with the boosting mode is changed. In such a control system, however, it is necessary to reduce the duty ratio of the transfer mode with the boosting mode or that of the boosting mode with the transfer mode because a rate of change of the ideal sine wave $10a$ is maximum in the vicinity of a zero-cross of alternate current input voltage. Further, a waveform distortion during a period D shown by (a) of FIG. 4 is produced due to an unbalance between the foregoing energy and an energy transferred to the capacitor during the succeeding transfer mode or due to accumulation times of the semiconductor switches SW01, SW02, SW03 and SW04, because the energy accumulated in the choke coil L01 is small in the vicinity of the zero-cross of alternate current input voltage during the boosting mode.

SUMMARY OF THE INVENTION

Object of the Invention

An object of the invention is to provide a control system for an electric power supply which can satisfactorily approximate an alternate input current to an ideal sine wave without being affected by accumulation times of semiconductor switches.

Another object of the invention is to provide a control system for an electric power supply which can satisfactorily eliminate a higher harmonic failure or a lowering of power factor without producing a waveform distortion due to an energy unbalance in the vicinity of a zero-cross of alternate current input voltage.

Structure of the Invention

This invention provides a control system for an electric power supply approximating an alternate input current supplied from an alternate current power supply to an ideal sine wave by means of alternate switching between a boosting mode in which an output of alternate current power supply is directly rectified by a rectifying circuit, an output of the rectifying circuit is controlled by plural semiconductor switches and the output of the rectifying circuit is accumulated in a choke coil as an electromagnetic energy, and a transfer mode in which the electromagnetic energy accumulated in the choke coil is supplied through a transformer to a load side; characterized by that an upper limit value is set up which is larger by a prescribed value than a current value of the ideal sine wave, a lower limit value is set up which is smaller by a prescribed value than the current value of the ideal sine wave, plural semiconductor switches are actuated according to clock pulses of specified frequency supplied from a clock pulse generator so that the boosting mode is maintained until the alternate input current increases to reach the upper limit setting value during the boosting mode and the transfer mode is maintained until the alternate input current decreases to reach the lower limit setting value during the transfer mode, thus the semiconductor switches are actuated according to the frequency of clock pulse at the time of this transfer mode.

BRIEF DESCRIPTION OF THE DRAWINGS

FIG. 3 is a block diagram of an electric power supply employing a conventional control system.

FIG. 4 shows diagrams of signal waveforms of the same electric power supply.

DETAILED DESCRIPTION OF THE INVENTION

Embodiment

Figure 1:
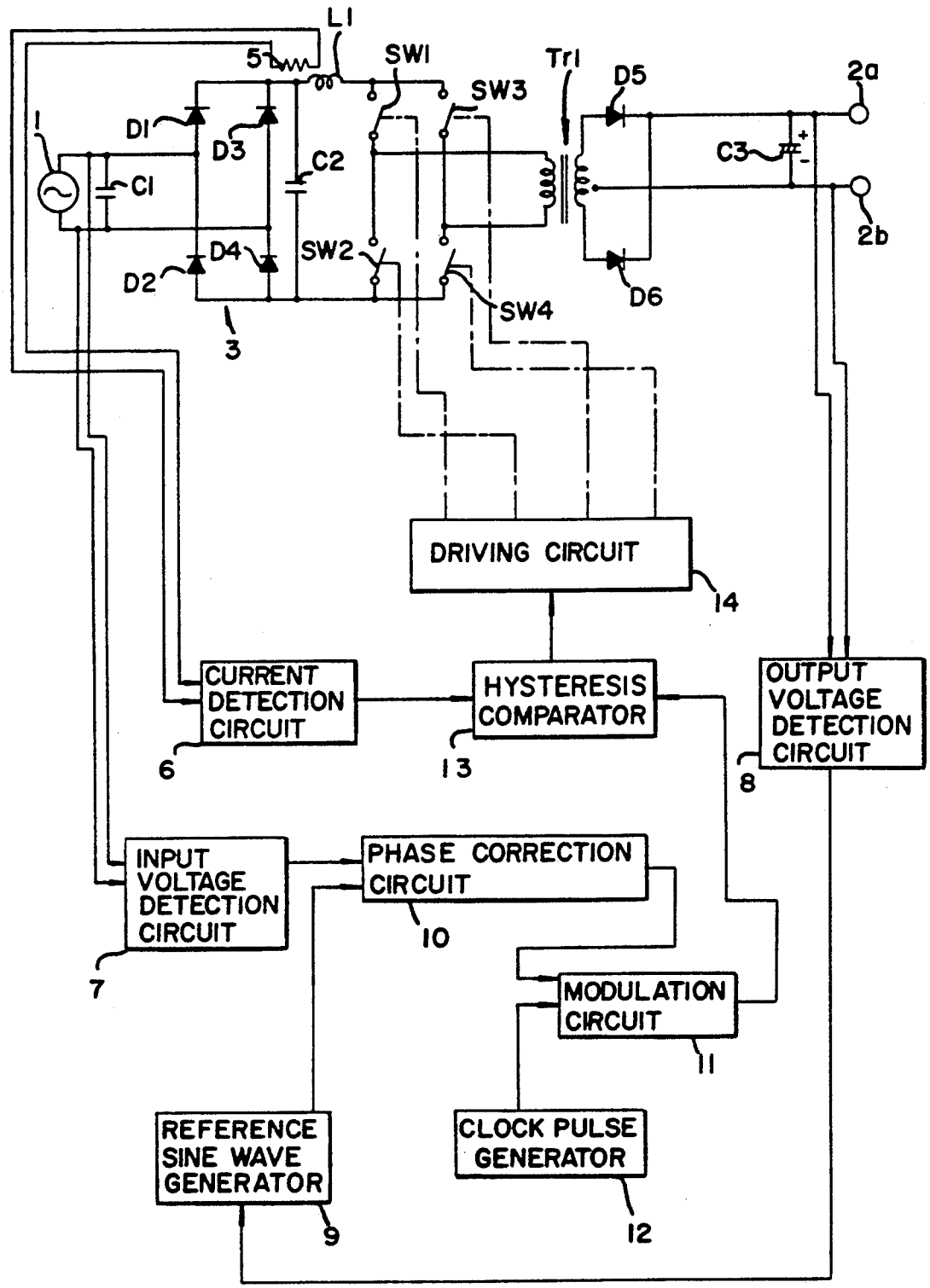
FIG. 1 is a block diagram of an electric power suuply employing a control system according to one embodiment of this invention.
Figure 2A:
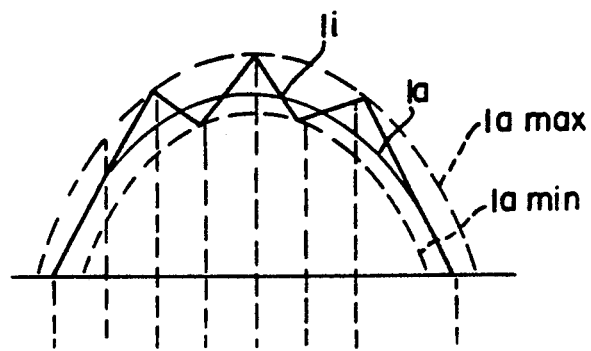
FIG. 2 shows diagrams of signal waveforms of the same electric power sypply.
Figure 2B:
Figure 2C:
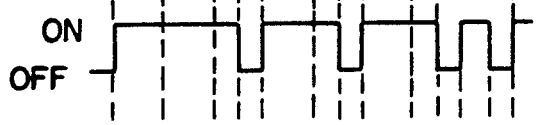
Figure 2D:
Figure 2E:
Figure 2F:
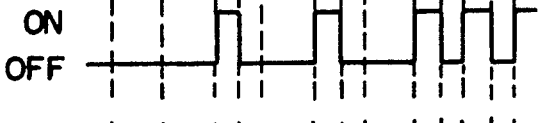
Figure 2G:

In FIG. 1 which is the block diagram of the electric power supply employing the control system according to one embodiment of this invention, one end of an alternate current power supply 1 such as a commercial power supply etc. is connected to one end of a capacitor C1, an anode of a diode D1 and a cathode of a diode D2. A cathode of the diode D1 is connected to a cathode of a diode D3, one end of a capacitor C2 of small capacity for removal of high frequency components, and one end of a choke coil L1. The other end of the choke coil L1 is connected to one end of a semiconductor switch SW1 comprising a switching element such as a bipolar transistor and field effect transistor etc. The other end of the semiconductor switch SW1 is connected to one end of a primary winding of a transistor Tr1 and one end of a semiconductor switch SW2, and one end of a semiconductor switch SW3 is connected to a connection point of the other end of the choke coil L1 and the one end of the semiconductor switch SW1. The other end of the semiconductor switch SW3 is connected to the other end of the transformer Tr1 and one end of a semiconductor switch SW4. The other end of the semiconductor switch SW4 is connected to the other end of the semiconductor switch SW2, the other end of the capacitor C2, an anode of a diode D4 and an anode of the diode D2. A cathode of the diode D4 is connected to an anode of the diode D3, the other end of the capacitor C1 and the other end of the alternate current power supply 1. One end of a secondary winding of the transformer Tr1 is connected to an anode of a diode D5, and a cathode of the diode D5 is connected to a cathode of a diode D6, one end of a smoothing capacitor C3 and one output terminal 2a. A center tap of the secondary winding of the transformer Tr1 is connected to other end of the capacitor C3 and the other output terminal 2b, and the other end of the secondary winding of the transformer Tr1 is connected to an anode of the diode D6. The diodes D1, D2, D3 and D4 are bridge connected to compose a rectifying circuit 3. The output terminals 2a and 2b are connected to a load.

Both ends of a current detector 5 which detects a current flowing to the choke coil L1 are connected to input ends of a current detection circuit 6. Both ends of the alternate current power supply 1 are connected to input ends of an input voltage detection circuit 7, and output terminals 2a and 2b are connected to input ends of an output voltage detection circuit 8. An output end of the output voltage detection circuit 8 is connected to a control signal input end of a reference sine wave generator circuit 9, and an output end of the reference sine wave generator circuit 9 is connected to one input end of a phase correction circuit 10. An output end of the input voltage detection circuit 7 is connected to the other input end of the phase correction circuit 10, and an output end of the phase correction circuit 10 is connected to one input end of a modulation circuit 11. An output end of a clock pulse generator 12, which outputs clock pulses having a prescribed frequency of about 50KHz to 100KHz (preferably, as large as a conversion frequency of switching regulator), is connected to the other input end of the modulation circuit 11, and an output end of the modulation circuit 11 is connected to one input end of a hysteresis comparator 13. An output end of the current detection circuit 6 is connected to the other input end of the hysteresis comparator 13, and an output end of the hysteresis comparator 13 is connected to an input end of a driving circuit 14. Four output ends of the driving circuit 14 are connected to driving signal input ends of the semiconductor switches SW1, SW2, SW3 and SW4.

Function of the Invention

An alternate current input voltage sent from the alternate current power supply 1 is detected by the input voltage detection circuit 7, and a detected output of the input voltage detection circuit 7 is inputted in the phase correction circuit 10 together with a reference sine wave sent from the reference sine wave generator circuit 9. The reference sine wave sent from the reference sine wave generator circuit 9 is corrected by the phase correction circuit 10 to the same phase as the alternate current input voltage, and inputted in the modulation circuit 11 together with the clock pulses sent from the clock pulse generator 12. A signal representing the reference sine wave sent from the phase correction circuit 10, is outputted from the modulation circuit 11. This signal is inputted in the hysteresis comparator 13 to be compared with a voltage signal corresponding to a current flowing from the current detection circuit 6 to the choke coil L1. The hysteresis comparator 13 makes out a control signal for the semiconductor switches SW1, SW2, SW3 and SW4 judging from the compared result, and this control signal is amplified by the driving circuit 14 to be supplied to the driving signal input ends of the semiconductor switches SW1, SW2, SW3 and SW4 as driving signals. Incidentally, the control signal sent from the hysteresis comparator 13 synchronizes with the clock pulse sent from the clock pulse generator 12.

On the other hand, a direct current output voltage obtained between the output terminals 2a and 2b is converted by the output voltage detection circuit 8 to an appropriate level and supplied to the reference sine wave generator circuit 9. The reference sine wave generator circuit 9 makes an amplitude of the reference sine wave small when a voltage from the output voltage detection circuit 8 is high, and makes the amplitude of the reference sine wave large when the voltage from the output voltage detection circuit 8 is low. Namely, an amplitude of the modulation signal inputted in the hysteresis comparator 13 also becomes large when the amplitude of the reference sine wave becomes large, so that a transmitted energy becomes large and the direct current output voltage becomes high, thus a negative feedback circuit is composed.

In FIG. 2 which shows diagrams of signal waveforms in the circuit of FIG. 1, a current Ii flowing through the choke coil L1 diagrammed in (a) corresponds to an output of the current detection circuit 6. Since the capacitor C2 is installed in this embodiment, the alternate current input signal is obtained by subtracting high frequency components from the current Ii flowing through the choke coil L1 by means of the capacitor C2. In case where the capacitor C2 is not installed, the current flowing through the choke coil L1 itself becomes the alternate input current An ideal sine wave Ia corresponds to an output of the modulation circuit 11. An upper limit setting value Iamax and lower limit setting value Iamin are decided by a hysteresis width of the hysteresis comparator 13. In FIG. 2, (b) represents a clock pulse outputted from the clock pulse generator 12, (c) represents the control signal of the semiconductor switch SW1, (d) represents the control signal of the semiconductor switch SW2, (e) represents the control signal of the semiconductor switch SW3, (f) represents the control signal of the semiconductor switch SW4 and (g) represents the secondary side output of the transformer Tr1, respectively.

Here, the voltage having an amplitude corresponding to the ideal sine wave Ia is compared with the voltage corresponding to the current Ii by the hysteresis comparator 13 at a time t1, and the difference Ii−Ia does not reach the set hysteresis width Iamx−Ia. Therefore, the hysteresis comparator 13 keeps the semiconductor switches SW1 and SW2 turned on and the semiconductor switches SW3 and SW4 turned off, so as to maintain the boosting mode. When the difference Ii−Ia reaches the set hysteresis width Iamax−Ia at a time t2, the hysteresis comparator 13 turns off the semiconductor switch SW2 and turns on the semiconductor switch SW4 with the semiconductor switch SW1 turned on and the semiconductor switch SW3 turned off, so as to shift the current mode to the transfer mode. Under the transfer mode, a state of the semiconductor switches SW1 and SW4 turned on and a state of the semiconductor switches SW2 and SW3 turned on arise alternately and repeatedly on every cycle of the clock pulse. Accordingly, the transfer mode gets in a reversed phase at a time t3. Then, the voltage having the amplitude corresponding to the ideal sine wave Ia is compared with the voltage corresponding to the current Ii by the hysteresis comparator 13 at a time t4, and the difference Ii−Ia reaches the set hysteresis width Iamx−Ia. Therefore, the current mode is shifted to the boosting mode again, and the boosting mode is maintained until a time t5 at which the difference Ii−Ia reaches the set hysteresis width Iamax−Ia. The boosting mode and the transfer mode are repeated alternately in the same way hereinafter, thus the current Ii is approximated to the ideal sine wave Ia. A frequency of clock pulse is shown on a large scale in FIG. 2 for the purpose of easy understanding, however, the practical frequency of clock pulse is about 50KHz to 100KHz in contrast to the frequency of ideal sine wave Ia of about 50Hz to 60Hz. Since the semiconductor switches SW1, SW2, SW3 and SW4 turn on and off synchronizing with a built-up of clock pulse, it can not be said that bent points of the current Ii coincide physically and completely with the upper limit setting value Iamax and the lower limit setting value Iamin. Considering a ratio of the frequency of ideal sine wave Ia to the frequency of clock pulse, however, it may be safely said that they substantially coincide each other.

As mentioned above, a period from one boosting mode to the next boosting mode or a period from one transfer mode to the next transfer mode is unsettled, and the operation time of the boosting mode becomes long in a range of large increasing rate of ideal sine wave Ia. The operation time of boosting mode becomes short and the operation time of transfer mode becomes long as the increasing rate of ideal sine wave becomes small, thus rate of ON/OFF switching of the semiconductor switches SW1, SW2, SW3 and SW4 increases. Accordingly, if the frequency of clock pulse is previously set to about the conversion frequency of switching regulator, the alternate input current can be satisfactorily approximated to the ideal sine wave Ia without being affected by the accumulation time of the semiconductor switches SW1, SW2, SW3 and SW4. Further, since the boosting mode or the transfer mode is maintained in the vicinity of the zero-cross of alternate current input voltage, the waveform distortion due to the energy unbalance will not be produced.

A measured waveform distortion rate of the alternate input current has been 6.2% in the conventional system, but it is supposed to be below 3% in this embodiment.

It is not necessary to employ the circuit structure as described in the above embodiment when practically applying the present invention, but a variety of modification may be employed. For example, PLL circuit may be applied for the modulation circuit 11.

The capacitor C2 of small capacity for removal of high frequency components is installed in the foregoing embodiment, however, the present invention is not limited to such a structure and the capacitor C2 may be omitted. For example, the present invention is applicable not only to a single-phase circuit but also to a three-phase circuit. Since a ripple ratio of output of the rectifying circuit 3 is small in case of the three-phase circuit, the system dispenses with the capacitor C2.

Effect of the Invention

As described above, the period from one boosting mode to the next boosting mode or the period from one transfer mode to the next transfer mode is settled in the conventional system. On the contrary, the system according to the present invention is so controlled that the operation time of the boosting mode becomes long in the range of large increasing rate of ideal sine wave, the operation time of boosting mode becomes short and the operation time of transfer mode becomes long as the increasing rate of ideal sine wave becomes small, thus switching ON/OFF frequencies of the semiconductor switches SW1, SW2, SW3 and SW4 increase. Accordingly, if the frequency of clock pulse is previously set to about the conversion frequency of switching regulator, the alternate input current can be satisfactorily approximated to the ideal sine wave Ia without being affected by the accumulation time of the semiconductor switches. Further, since the boosting mode or the transfer mode is maintained in the vicinity of the zero-cross of alternate current input voltage, the waveform distortion due to the energy unbalance will not be produced. Therefore, the higher harmonic failure or the lowering of power factor can be eliminated.

What is claimed is:

1. A control system for an electric power source for approximating an alternate input current supplied from an alternate current power line into an ideal sine wave, said electric power source comprising:

rectifying means coupled to the output of said alternating current power line for rectifying the output thereof;

bridge semiconductor switch means coupled to the output of said rectifying means; and choke coil means coupled between said rectifying means and said bridge switch means for storing electromagnetic energy therein, wherein said bridge switch means is switched between a boosting mode in which the output of said alternate current power line is stored in said choke coil means and a transfer mode in which the output energy stored in said choke coil means is transmitted to a load through a transformer means, connected to said bridge switch means, a control system for switching said bridge switch means between the boosting mode and the transfer mode, said control system comprising:

current detection means for detecting current passed through said choke coil means, input voltage detection means for detecting input voltage from said power line;

output voltage detection means for detecting output voltage of the electric power source;

reference sine wave generator means for generating a reference sine wave signal in proportion to the output of said output voltage detection means;

phase correction means connected to said input voltage detection means and to said reference sine wave generator means, said phase correction means bringing the input AC voltage and the reference sine wave into the same phase;

modulation means connected to a clock pulse generator for generating a clock pulse train at a predetermined frequency and to said phase correction means, wherein said modulation means generates a reference sine wave from the phase correction means as an ideal sine wave, triggered by each clock pulse; and driving means for controlling said bridge semiconductor switch means, said driving means including a hysteresis comparator means connected to said current detection means and to said modulation means, said hysteresis comparator means having an upper limit setting value which is greater by a predetermined value than the peak current value of the ideal sine wave from the modulation means and a lower limit setting value which is less by a predetermined value than that of said ideal sine wave, wherein when the output of said current detection means is less than the output of said modulation means, said driving means actuates the bridge semiconductor switch means for maintaining said boosting mode until the alternating current input reaches the upper limit setting value, and when the output of said current detection means is greater than the output of said modulation means, said driving means actuates the bridge semiconductor switch means at frequency of said clock pulse generator for maintaining the transfer mode until the alternating current input reaches the lower limit setting value.

* * * * *